United States Patent
Choudhary et al.

(10) Patent No.: US 11,577,331 B2
(45) Date of Patent: Feb. 14, 2023

(54) METHODS OF MANUFACTURING PART WITH HOLE HAVING CUT THREADS

(71) Applicant: GM GLOBAL TECHNOLOGY OPERATIONS LLC, Detroit, MI (US)

(72) Inventors: Lokesh Choudhary, Bangalore (IN); Qigui Wang, Rochester Hills, MI (US); Tiruttani Munikamal, Bangalore (IN); David A. Wulbrecht, Clarkston, MI (US); Gregory Melekian, Clarkston, MI (US); Anil K. Sachdev, Rochester Hills, MI (US)

(73) Assignee: GM GLOBAL TECHNOLOGY OPERATINS LLC, Detroit, MI (US)

( * ) Notice: Subject to any disclaimer, the term of this patent is extended or adjusted under 35 U.S.C. 154(b) by 21 days.

(21) Appl. No.: 17/134,986

(22) Filed: Dec. 28, 2020

(65) Prior Publication Data
US 2022/0203468 A1    Jun. 30, 2022

(51) Int. Cl.
*B23G 5/20* (2006.01)
*B23G 5/06* (2006.01)
*B23G 9/00* (2006.01)

(52) U.S. Cl.
CPC ............ *B23G 5/20* (2013.01); *B23G 5/06* (2013.01); *B23G 9/00* (2013.01); *B23G 2200/14* (2013.01); *B23G 2200/146* (2013.01); *B23G 2240/36* (2013.01)

(58) Field of Classification Search
CPC ... B23G 5/06; B23G 5/20; B23G 9/00; B23G 9/008; B23G 2200/14; B23G 2240/36
See application file for complete search history.

(56) References Cited

U.S. PATENT DOCUMENTS

| | | | | |
|---|---|---|---|---|
| 2,112,284 A * | 3/1938 | Gaess | ............... | B21K 1/64 470/138 |
| 2,300,310 A * | 10/1942 | Poeton | ............... | B23G 5/06 408/219 |
| 3,067,509 A * | 12/1962 | Welles, Jr. | ............... | B24B 39/02 72/464 |
| 3,245,099 A * | 4/1966 | Zagar | ............... | B63C 11/04 408/219 |
| 3,396,562 A * | 8/1968 | Thigpen | ............... | B21D 28/24 72/464 |
| 3,429,171 A * | 2/1969 | Feher | ............... | B21D 31/02 72/464 |
| 5,687,634 A * | 11/1997 | Ransone | ............... | F02F 7/0085 264/29.7 |
| 6,848,438 B2 * | 2/2005 | Celerier | ............... | B21C 37/298 123/703 |

(Continued)

FOREIGN PATENT DOCUMENTS

DE    19911308 A1 *    9/2000    ............ B21J 5/066
DE    10221675 B4 *    3/2006    ............ F02F 1/10

(Continued)

*Primary Examiner* — Eric A. Gates
(74) *Attorney, Agent, or Firm* — Lorenz & Kopf LLP

(57) ABSTRACT

A method of manufacturing a threaded hole in a workpiece includes providing the workpiece having a region with a hole. The method also includes cutting a threading for the hole. Furthermore, the method includes, independent of cutting the threading, densifying the region proximate the hole to reduce material porosity in the region.

20 Claims, 3 Drawing Sheets

(56) References Cited

U.S. PATENT DOCUMENTS

| | | | | |
|---|---|---|---|---|
| 6,931,901 B2* | 8/2005 | Ghiran | ............... | B21D 28/28 |
| | | | | 72/370.27 |
| 7,168,858 B2* | 1/2007 | Cadle | ............... | F16C 35/00 |
| | | | | 384/432 |
| 7,441,433 B2* | 10/2008 | Ghiran | ............... | B23G 7/02 |
| | | | | 72/71 |
| 7,552,610 B2* | 6/2009 | Fujiuchi | ............... | B23G 5/20 |
| | | | | 470/84 |
| 8,220,301 B2* | 7/2012 | Ghiran | ............... | B23G 5/20 |
| | | | | 72/71 |
| 11,179,810 B2* | 11/2021 | Ruetz | ............... | B23K 26/083 |

FOREIGN PATENT DOCUMENTS

| | | | | |
|---|---|---|---|---|
| DE | 102005032065 A1 | 3/2006 | | |
| DE | 60213225 T2 * | 6/2007 | ............ | B22F 3/24 |
| DE | 2058991 A1 | 8/2020 | | |
| DE | 102019102726 A1 | 8/2020 | | |
| JP | 05253747 A * | 10/1993 | | |
| WO | WO-2010022420 A1 * | 3/2010 | ............ | F02F 7/0053 |

* cited by examiner

METHODS OF MANUFACTURING PART WITH HOLE HAVING CUT THREADS

INTRODUCTION

The technical field generally relates to methods of manufacturing parts and, more particularly, relates to methods of manufacturing a part with a hole having cut threads.

Some parts include threaded holes for threaded attachment to another component. For example, vehicle engine blocks often include a threaded hole for receiving, supporting, and threadably attaching to a bearing component. More specifically, the engine block may include a main bearing bolt hole that is threaded. Preferably, these and other types of threaded holes have high fatigue resistance, high load retention strength, and other advantageous performance characteristics.

However, conventional methods for threading holes are deficient in certain respects. The threading tools, machinery, systems, etc. that are currently available are similarly deficient. These limitations may be exacerbated in high-volume manufacturing processes. Accordingly, performance of the manufactured threaded hole and the respective threaded attachment is limited. Furthermore, manufacturing methods and systems of this type may be inefficient or may suffer from other problems.

Therefore, it is desirable to provide improved methods and systems for manufacturing parts with high-quality threaded holes. It is also desirable to provide improved methods and systems for manufacturing parts with threaded holes having high fatigue resistance and low bolt load loss characteristics. Furthermore, it is desirable to provide manufacturing efficiencies in these systems and methods. Other desirable features and characteristics of the present disclosure will become apparent from the subsequent detailed description and the appended claims, taken in conjunction with the accompanying drawings and the foregoing technical field and background.

SUMMARY

A method is provided for manufacturing a threaded hole in a workpiece. In one embodiment, the method includes providing the workpiece having a region with a hole. The method also includes cutting a threading for the hole. Furthermore, the method includes, independent of cutting the threading, densifying the region proximate the hole to reduce material porosity in the region.

In some embodiments, densifying the region includes radially expanding the hole before cutting the threading for the hole.

In some embodiments, cutting the threading includes providing a plurality of cut threads at a minor diameter. Also, radially expanding the hole includes expanding the hole from a first hole diameter to a second hole diameter. Moreover, the second diameter dimension is approximately equal to the minor diameter.

Furthermore, in some embodiments, cutting the threading includes providing a plurality of cut threads at a minor diameter. Also, radially expanding the hole includes expanding the hole from a first hole diameter to a second hole diameter. Additionally, in embodiments, the method further includes selecting the second diameter according to the minor diameter.

In some embodiments, cutting the threading includes providing a plurality of cut threads at a major diameter. Furthermore, radially expanding the hole includes densifying the region within a zone radiating outward from the hole to an outer radial dimension that is, at least, equal to the major diameter.

In some embodiments, radially expanding the hole includes radially expanding the hole via cold working.

In some embodiments, cutting the threading includes providing a plurality of cut threads for the hole. Also, densifying the region includes rolling the plurality of cut threads to form a plurality of rolled threads.

In some embodiments, the plurality of cut threads have a cut thread major diameter. The method further includes forming, in the plurality of rolled threads, a rolled thread major diameter. Also, the method includes forming the cut thread major diameter to be at most, ninety-five percent (95%) of the rolled thread major diameter.

Furthermore, in some embodiments, the cut thread major diameter is between approximately eighty percent (80%) and ninety-five percent (95%) of the rolled thread major diameter.

In some embodiments, the method includes providing a hybrid tap with a cutting portion and a forming portion, wherein the forming portion is attached to the cutting portion and arranged therewith along a longitudinal axis of the hybrid tap. Also, cutting the threading includes cutting the threading with the cutting portion. Moreover, rolling the plurality of cut threads includes rolling the plurality of cut threads with the forming portion.

In some embodiments, cutting the threading includes providing a plurality of cut threads for the hole. Also, densifying the region includes burnishing the plurality of cut threads.

Also, a manufacturing system is provided for making a workpiece with a threaded hole. In one embodiment, the manufacturing system includes a thread cutting device configured for cutting a threading for a hole that is provided in a region of the workpiece. The manufacturing system also includes a densifying device configured for, independent of the cutting performed by the thread cutting device, densifying the region proximate the hole to reduce material porosity in the region.

In some embodiments, the densifying device is an expansion device configured for radially expanding the hole before the thread cutting device cuts the threading.

Also, in some embodiments, the thread cutting device is configured to cut a plurality of cut threads at a minor diameter. The expansion device is configured to radially expand the hole from a first hole diameter to a second hole diameter. The second diameter dimension is approximately equal to the minor diameter.

In some embodiments, the thread cutting device is configured to cut a plurality of cut threads at a major diameter. The expansion device is configured to radially expand the hole and densify the region within a zone radiating outward from the hole to an outer radial dimension that is, at least, equal to the major diameter.

In some embodiments, the expansion device is a cold work device configured for cold working the workpiece to radially expand the hole.

Moreover, in some embodiments, he thread cutting device is a cutting tap configured for cutting a plurality of cut threads for the hole. Also, the densifying device is a forming tap configured for rolling the plurality of cut threads to form a plurality of rolled threads.

In some embodiments, the thread cutting device is configured to cut the plurality of cut threads at a cut thread major diameter. The forming tap is configured to form a plurality of rolled threads having a rolled thread major diameter. The cut thread major diameter is, at most, ninety-five percent (95%) of the rolled thread major diameter.

In some embodiments, the thread cutting device is configured to provide a plurality of cut threads for the hole. The densifying device is a burnishing tool configured to burnish the plurality of cut threads.

Furthermore, a method of manufacturing a threaded hole in a main bearing bolt hole of an engine block is disclosed. In one embodiment, the method includes providing the engine block having a region with a hole. The method also includes cutting a threading for the hole. Additionally, the method includes, independent of cutting the threading, densifying the region proximate the hole to reduce material porosity in the region.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
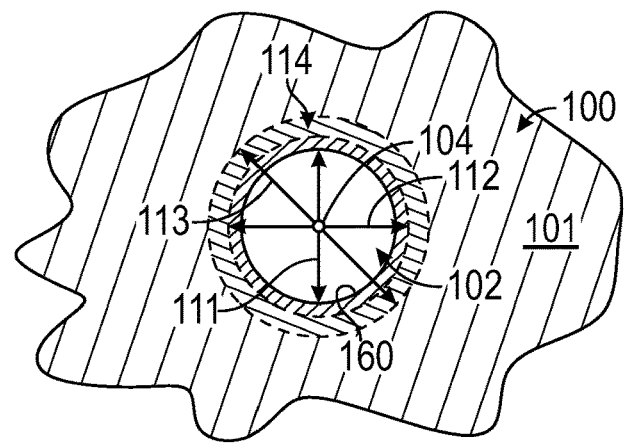
FIG. 1 is a schematic plan view of a workpiece with a hole according to example embodiments of the present disclosure.

The following detailed description is merely exemplary in nature and is not intended to limit the application and uses. Furthermore, there is no intention to be bound by any expressed or implied theory presented in the preceding technical field, background, brief summary or the following detailed description.

Generally, the present disclosure relates to manufacturing systems and methods for threading a hole in a workpiece, part, component, etc. The threaded hole provided using these systems and methods may provide high fatigue resistance, high load retention strength, and/or other improved characteristics.

In various embodiments, methods of manufacturing are disclosed for providing a threaded hole in a workpiece. Generally, these methods may include: (a) providing a workpiece having a region with a hole; (b) cutting a threading for the hole; and (c) independent of cutting the threading, densifying the region proximate the hole to reduce material porosity in the region. Cutting the threading provides certain benefits and densifying the region ameliorates certain characteristics associated with the cutting process. Thus, in combination, cutting the threading and densifying the region provides the resultant threaded hole with high fatigue resistance, high load retention strength, and/or other improved characteristics. Manufacturing systems are also disclosed that cut the threading for the hole and densify the region proximate the hole.

In some embodiments, the methods and systems of the present disclosure are employed for radially expanding the hole from a first diameter to a second diameter, which densifies the region proximate the hole, reduces porosity, increases residual compressive stress, etc. Subsequently, the expanded hole is threaded using a thread cutting tool. Material is removed from the expanded and densified hole to cut the threading. The resulting threaded hole has increased fatigue resistance, increased load retention strength, and other benefits. Furthermore, the manufacturing method and the associated manufacturing system provides increased manufacturing efficiencies, lowers costs, and results in other benefits.

In further embodiments, the methods and systems of the present disclosure are employed for initially cutting threading in the hole of the workpiece using a thread cutting device (e.g., a thread cutting tap). These methods and systems also include subsequently forming or rolling the previously cut threading using a thread forming device (e.g., a thread rolling tap). The forming/rolling method and device may be configured to cause local plastic deformation, further shaping the threading of the hole, and densifying the region radiating from the threaded hole. In some embodiments, the thread cutting device and the thread forming device may be attached together into a single, hybridized tool that both cuts and forms/rolls threading for added convenience and increased efficiency. The resulting threaded hole has increased fatigue resistance, increased load retention strength, and other benefits. Furthermore, the manufacturing method and the associated manufacturing system provides increased manufacturing efficiencies, lowers cost, and provides other benefits.

In additional embodiments, the methods and systems of the present disclosure are employed for initially cutting threading in the hole of the workpiece using a thread cutting device (e.g., a thread cutting tap). These methods and system also include subsequently burnishing the previously cut threading using a thread burnishing device (e.g., a thread burnishing tap). The burnishing device may be configured to polish and smooth the cut threads, and also to apply a radially outward load on the hole that densifies the region radiating from the threaded hole. In some embodiments, the thread cutting device and the burnishing device may be attached together into a single, hybridized tool that both cuts and burnishes threading for added convenience and increased efficiency. The resulting threaded hole has increased fatigue resistance, increased load retention strength, and other benefits. Furthermore, the manufacturing method and the associated manufacturing system provides increased manufacturing efficiencies, lowers cost, and provides other benefits.

The systems and methods of the present disclosure may be used for threading a wide variety of parts. These systems and methods may be employed for threading through-holes and blind holes. In some embodiments, one or more threaded holes may be provided in a vehicle engine block. More specifically, the threaded hole may be provided in a main bearing bolt hole. The manufacturing systems and methods may be useful for threading holes in a cast engine block (e.g., a cast aluminum alloy engine block), and the threading systems and methods of the present disclosure may be used in in parts that are manufactured using advanced casting techniques. However, it will be appreciated that the threading systems and methods of the present disclosure may be employed for any suitable part without departing from the scope of the present disclosure.

Referring initially to FIG. 1, a region 101 of a workpiece 100 with a hole 102 is illustrated. The hole 102 may be a through-hole that extends through a full wall thickness of the workpiece 100 as illustrated (see FIGS. 2A-6), or the hole 102 may be a blind hole that is recessed through part of the thickness of the workpiece 100 in additional embodiments. The workpiece 100 may be a part of any suitable type. For example, the workpiece 100 may be an engine block in some embodiments. Also, the workpiece 100 may be a cast aluminum alloy engine block. The hole 102 may ultimately be used as a main bearing bolt hole for the engine block.

The hole 102 has a hole axis 104. A number of diameters dimensions are indicated with respect to the hole axis 104, and these diameters are used as reference in explaining the methods and systems of the present disclosure. For example, the hole 102 may have a first diameter 111, which may represent an initial diameter 111 of the hole 102. The first diameter 111 may also be the smallest of the diameters indicated in FIG. 1. A second, larger diameter 112 and a third, even larger diameter 113 are indicated in FIG. 1. Thus, a zone 114 that is proximate the hole 102 and that radiates therefrom is indicated in FIG. 1. An outer radial boundary of the zone 114 may be defined by the third diameter 113.

As will be discussed, the hole 102 may be threaded (e.g., with cut threads) within the zone 114. In some embodiments, the threads may be contained radially within the zone 114 (i.e., the major diameter of the thread may be, at most, equal to the diameter 113. Furthermore, as will be discussed the zone 114 proximate the hole 102 may be densified to reduce porosity, increase residual compressive stress, etc. within the zone 114. As a result, the threaded hole may exhibit low fatigue resistance and high load retention strength.

This thread cutting and densification within the zone 114 may be provided separately and independently according to methods of the present disclosure. In other words, the thread cutting and densification may occur sequentially according to methods of the present disclosure. The thread cutting may occur before the densification of the zone about the hole, or the densification may occur prior to thread cutting. Manufacturing systems, tooling, etc. will also be discussed for the thread cutting and densification operations. As will be discussed, these systems, tooling, etc. and the associated manufacturing methods provide high manufacturing efficiency, lower costs, etc.

Figures 2A, 2B:
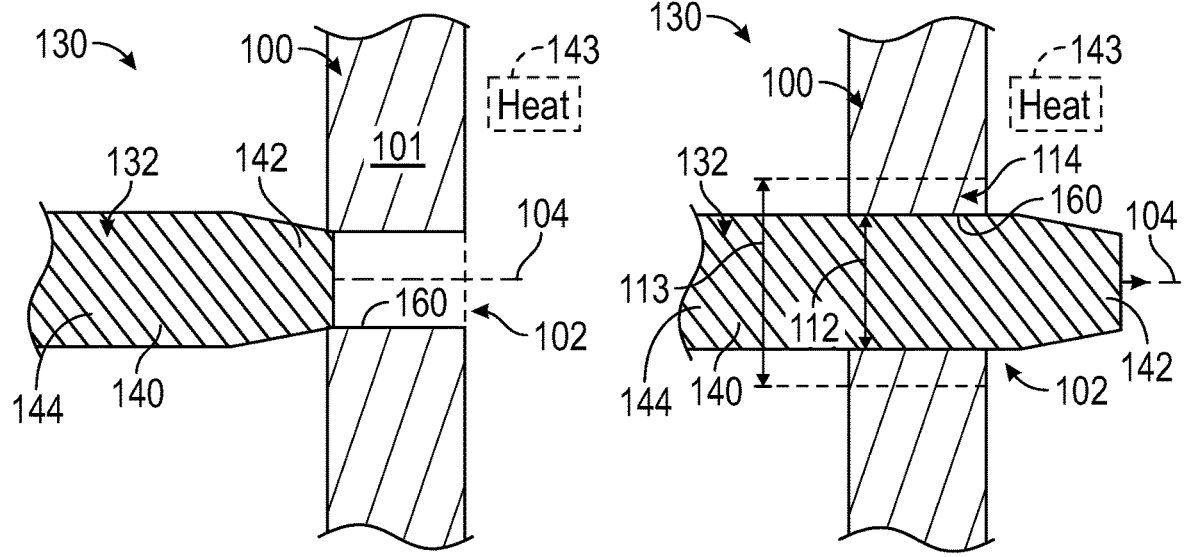
FIGS. 2A, 2B, and 3 are schematic illustrations of a method of forming a threaded hole from the hole of FIG. 1 according to embodiments of the present disclosure.
Figure 3:
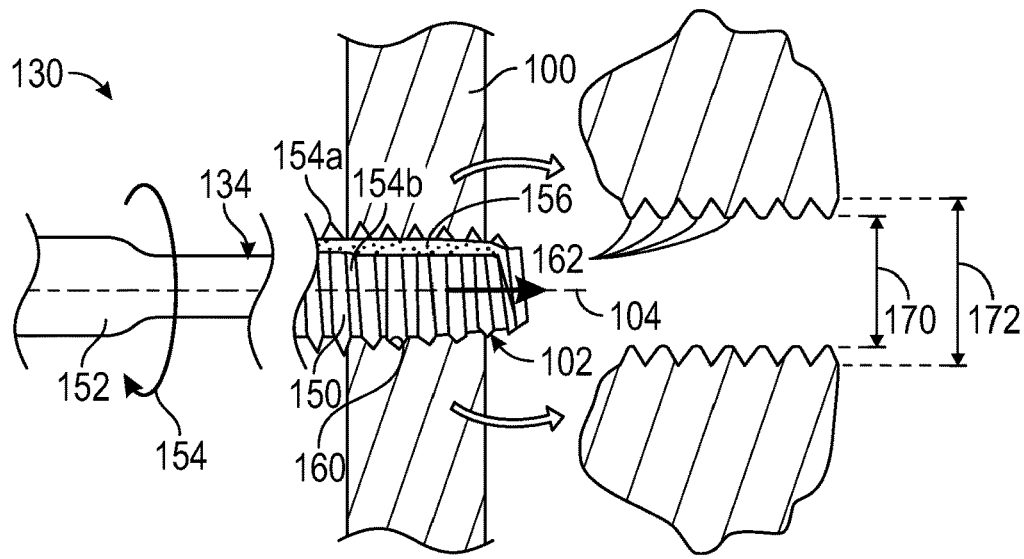

Referring now to FIGS. 2A, 2B, and 3, a manufacturing system 130 for making the workpiece 100 with a threaded hole is illustrated according to example embodiments. As will be discussed, the system 130 may generally include a densifying device 132 (FIGS. 2A and 2B) and a thread cutting device 134 (FIG. 3). The densifying device 132 may be configured for densifying the zone 114 proximate the hole 102 to reduce material porosity in the zone 114 and to increase residual compressive stress in the zone 114. The thread cutting device 134 may be configured for cutting threads in the densified zone 114.

As shown in FIG. 2A, the densifying device 132 may include a cold work device configured to be inserted in the hole 102 and to exert a force directed radially away from the axis 104 for cold working and plastically deforming the workpiece 100. For example, the densifying device 132 may be a rounded, cylindrical rod 140 made of a material with high material stiffness, toughness, and strength. The rod 140 may include a tapered end 142 and a finishing portion 144. The tapered end 142 may gradually increase in diameter or width from a terminal end toward the finishing portion 144. The finishing portion 144 may have a constant diameter. In some embodiments, the diameter of the finishing portion 144 may be chosen according to the second diameter 112, and in some embodiments, the diameter of the finishing portion 144 may be approximately equal to the second diameter 112.

Also, as shown in FIG. 3, the thread cutting device 134 may include a thread cutting tap 150. The tap 150 may be elongate and may be centered on the axis 104. The tap 150 may include a shank 152. The tap 150 may also include a plurality of toothed lands 154a, 154b that are separated in the circumferential direction by chip openings 156 (e.g., flutes). Although only two lands 154a, 154b and one opening 156 are shown, it will be appreciated that there may be three or more lands with respective openings 156 separating neighboring lands in the circumferential direction. The chip openings 156 may be recessed slots that extend longitudinally along the tap 150. The teeth of the lands 154 may cut into and remove material from the workpiece 100 when inserted and rotated within the hole 102 as will be discussed.

Various manufacturing methods are provided for threading the hole 102 with the system 130 according to embodiments of the present disclosure. Initially, the workpiece 100 may be provided with the hole 102 within the region 101 (FIGS. 1 and 2A). In some embodiments, the hole 102 may be cast into the region 101, or in other embodiments, drilled, punched, or otherwise defined in the region 101. The hole 102 may have a smooth inner diameter surface 160, which defines the first diameter dimension 111.

Then, as shown in FIGS. 2A and 2B, the tapered end 142 of the rod 140 may be advanced along the axis 104 and into the hole 102 until the finishing portion 144 of the rod 140 is received within the hole 102. Insertion of the rod 140 may exert sufficient force on the workpiece 100 to radially expand the hole 102.

The shape and dimensions of the rod 140, the insertion pressure applied, and/or other variables may be chosen such that the amount of expansion of the hole 102 may be controlled. For example, in some embodiments, the hole 102 may be radially expanded from the first diameter 111 to the second diameter 112. Thus, as stated above, the diameter of the finishing portion 144 of the rod 140 may be approximately equal to the second diameter 112 for controlling the expansion of the hole 102.

Expansion of the inner diameter surface 160 from the first diameter 111 to the second diameter 112 may also densify the material of the workpiece 100 within the zone 114. More specifically, the cold work performed during radial expansion of the hole 102 may reduce porosity of the material within the zone 114 and increase residual compressive stress within the zone 114, between the second diameter 112 and the third diameter 113.

It will be appreciated that, in additional embodiments, the densifying device 132 and the manufacturing system 130 may be configured for performing other types of cold work for expanding the hole 102, configured with different tooling, etc. Furthermore, it will be appreciated that the densifying device 132 and the manufacturing system 130 may be configured for hot working the workpiece 100 when expanding the hole 102. In other words, the densifying device 132 and/or the manufacturing system 130 may optionally include a heat source 143 for applying heat above the recrystallization temperature of the workpiece 100 during plastic deformation and expansion of the hole 102. This may allow the material to recrystallize during deformation. Like the cold working embodiments illustrated, the hot working process may densify the zone 114, reduce porosity therein, and/or provide other benefits.

Subsequently, as shown in FIG. 3, the tap 150 may be rotated about the axis 104 and advanced into the hole 102. The teeth of the tap 150 may cut a plurality of threads 162 in the inner diameter surface 160 of the hole 102. Material may be removed from the workpiece 100 to cut the threads 162. Chips of the material may be received in the chip openings 156 and may move therein along the axis 104. Further advancement of the tap 150 along the axis 104 and further rotation about the axis 104 may remove more material and further cut the threads 162 in the workpiece 100.

The shape, dimension, profile, etc. of the tap 150 may be chosen to control the shape, dimension, profile, etc. of the threads 162. Also, the tap 150 may be shaped, dimensioned, etc. such that the threads 162 are cut substantially (e.g., entirely) within the zone 114, which was previously densified as represented in FIGS. 2A and 2B.

For example, in some embodiments the tap 150 may be configured to cut the threads 162 to have a minor diameter 170 and a major diameter 172. Those having ordinary skill in the art will understand that the minor diameter 170 is measured with respect to the axis 104 and is the smallest diameter defined at peaks or crown tips of the cut threads 162 and that the major diameter 172 is measured with respect to the axis 104 and is the largest diameter defined at the roots of the cut threads 162. It will be understood, therefore, that the teeth on the tap 150 may have a major diameter that is equal to the major diameter 172 of the threads 162 and a minor diameter that is equal to the minor diameter 170 of the threads 162. In some embodiments, the minor diameter 170 may be chosen to be approximately equal to the second diameter 112 of the hole 102. Also, in some embodiments, the major diameter 172 may be chosen to be, at most, equal to the third diameter 113 of the hole 102. Accordingly, the threads 162 may be cut within the densified zone 114.

Accordingly, the densifying that occurs initially (FIGS. 2A and 2B) may be configured according to the subsequent threading (FIG. 3), which provides certain benefits. For example, energy may be expended when expanding the hole 102 and densifying the zone 114; however, this action also may serve to define or nearly define the minor diameter of the threads 162. This increases manufacturing efficiency. Also, the threads 162 may be cut within the previously densified zone 114, which ensures that the threads 162 exhibit high fatigue resistance and low bolt load loss.

Figure 4:
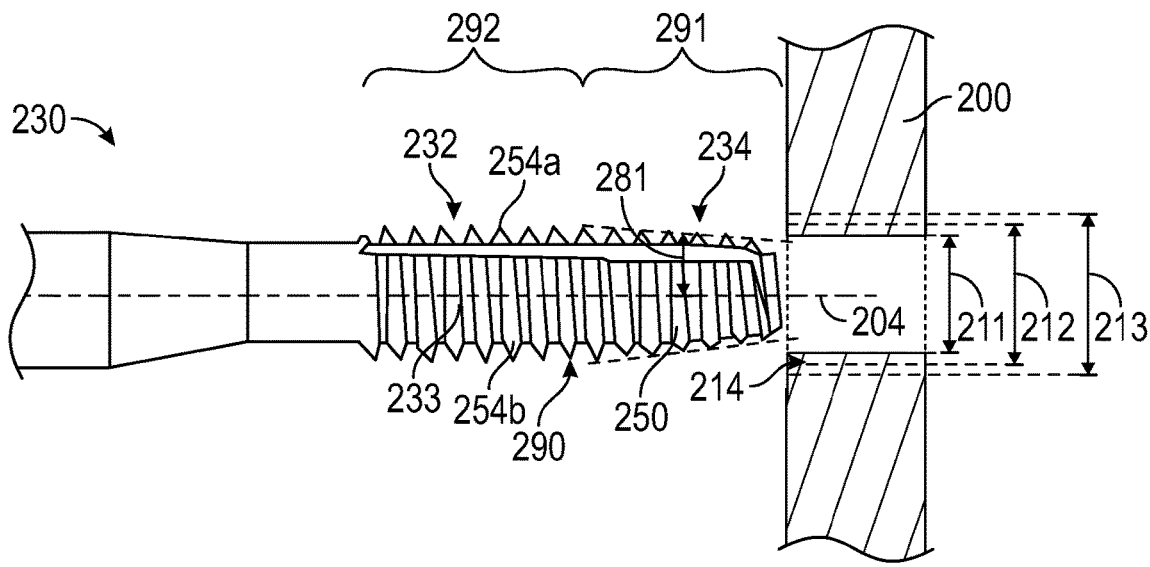
FIGS. 4, 5, and 6 are schematic illustrations of the method of forming the threaded hole from the hole of FIG. 1 according to additional embodiments of the present disclosure.
Figure 5:
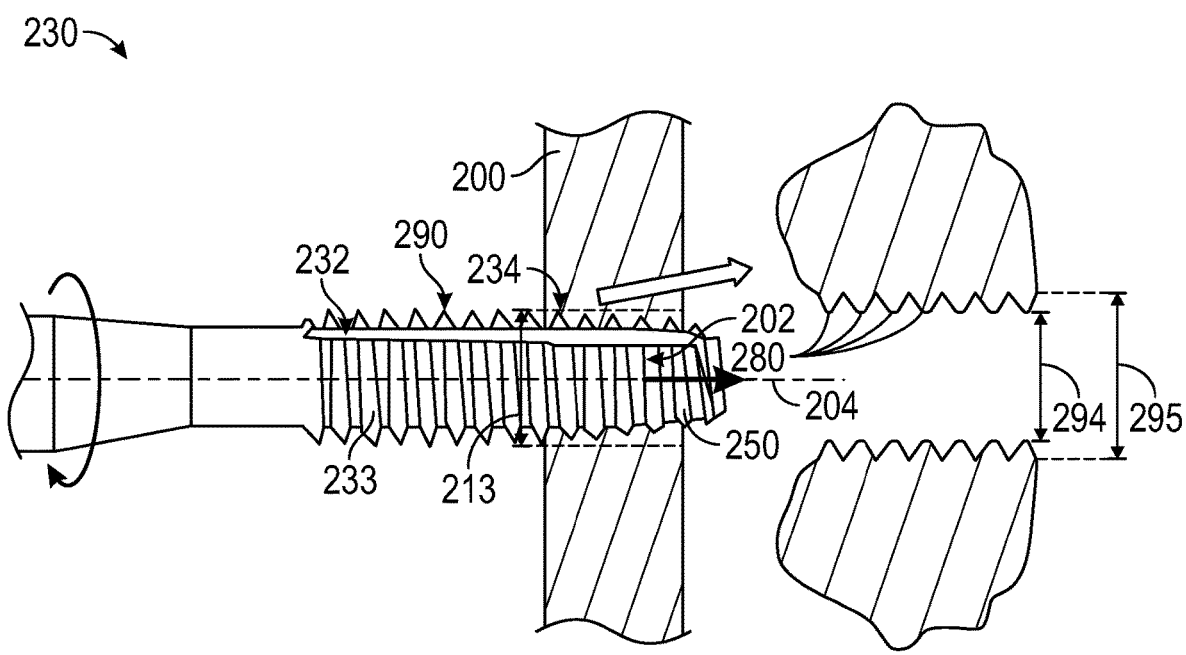
Figure 6:
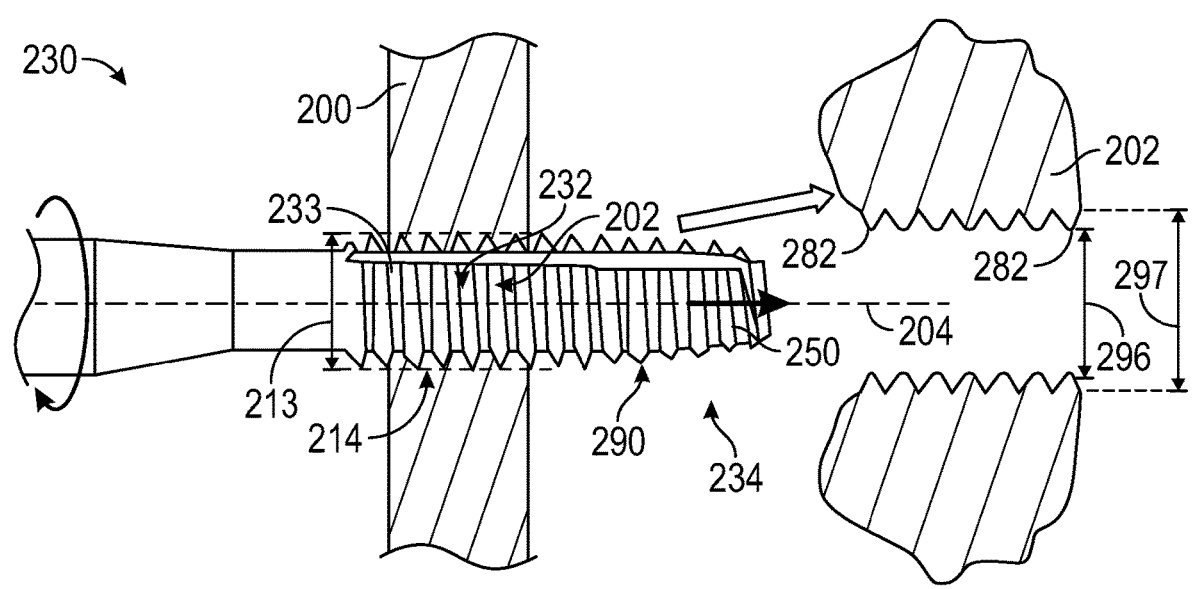

Referring now to FIGS. 4, 5, and 6, the manufacturing system 230 and methods for making the workpiece 200 with a threaded hole are illustrated according to additional embodiments of the present disclosure. The system 230 and the associated manufacturing methods may be substantially similar to the embodiments of FIGS. 2A-3 except as noted. Components that correspond to those of FIGS. 2A-3 are indicated with corresponding reference numbers increased by 100.

Like the embodiments of FIGS. 2A-3, the system 230 of FIGS. 4-6 may include a thread cutting device 234 and a densifying device 232. The thread cutting device 234 may be used to cut a threading for the hole 202 (FIG. 5). Thus, the thread cutting device 234 may be a cutting tap 250 with at least some of the features of the tap 150 discussed above with respect to FIG. 3. Once threaded by the cutting tap 250, the densifying device 232 may be used subsequently to densify the zone 214 via plastic deformation.

The dimensions (e.g., major/minor diameter), the profile, and/or characteristics of the densifying device 232 may be configured for plastically deforming the zone 214 in a predetermined manner. For example, the densifying device 232 may be elongate and may be generally rounded and arcuate in a cross section that is centered on the axis 204. In some embodiments, the diameter of the densifying device 232 may be generally greater than that of the thread cutting tap 250. Accordingly, the densifying device 232 may be received and rotated within the hole 202, applying a load to the threading previously cut by the cutting tap 250.

In some embodiments, the densifying device 232 may be configured as a burnishing tool that burnishes the threading cut by the tap 250. Accordingly, the densifying device 232 may have externally toothed lands 254a, 254b. The teeth of the lands 254a, 254b may extend along a helical path that is common to the teeth of the cutting tap 150. The teeth may be slightly larger in diameter in the densifying device 232 as compared to the cutting tap 150. The teeth of the lands 254a, 254b may rub against the threading cut by the tap 250, thereby providing some plastic deformation and outward radial expansion, and thereby polishing the threaded surfaces. This action and these loads may serve to densify the zone 214, reduce material porosity therein, and impart residual compressive stress. Accordingly, the quality of the cut threads may be improved.

In additional embodiments, the densifying device 232 may be configured as a thread forming device (thread rolling device) that rolls, plastically deforms, and further converts the cut threading into rolled threading. Accordingly, the toothed lands 254a, 254b may be somewhat larger in diameter than those of the thread cutting tap 250. Also, the profile of the teeth on the lands 254a, 254b may be somewhat different from those of the cutting tap 250. Accordingly, the teeth of the lands 254a, 254b may plastically deform and re-shape the cut threads into rolled threads. In some embodiments, the densifying device 232 may also radially expand the hole 202 and increase the diameter during formation of the rolled threading. More specifically, the teeth on the lands 254a, 254b may plastically deform the crown tips of the cut threads to convert them into rolled threads. Also, the rolling action may plastically deform the thread roots (between the crown tips). This action and these loads may serve to densify the zone 214 and reduce material porosity therein.

Furthermore, in some embodiments, the thread cutting device 234 and the densifying device 232 may be coupled and attached to define a unitary, one-piece, hybrid tool 290 (e.g., a hybrid tap) that both cut threads and densify the zone 214 sequentially in a single use. In some embodiments, the hybrid tool 290 may be elongate and generally cylindrical and may include a first portion 291 (cutting portion) and a second portion 292 (forming portion). The first portion 291 and the second portion 292 may be arranged end-to-end. In some embodiments, the first portion 291 may have a taper angle 281, whereas the second portion 292 may have a constant diameter. The thread cutting device 234 may be defined in the first portion 291 on one end, and the densifying device 232 may be defined in the second portion 292 further along the axis 204. As mentioned above, both the thread cutting device 234 and the densifying device 232 may include toothed lands 254a, 254b, which may be aligned longitudinally. There may be chip openings 256 that extend longitudinally and continuously between the lands 254a, 254b. Also the teeth on the lands 254a, 254b may extend along a helical path along the hybrid tool 290 between the first portion 291 and the second portion 292.

Furthermore, as discussed above, the densifying device 232 may be a burnishing tap or a thread rolling tap. Thus, the tool 290 may be a hybrid thread cutting and burnishing tool tap. In additional embodiments, the tool 290 may be a hybrid thread cutting and thread rolling tap.

During methods of manufacturing, the workpiece 200 may be provided with the hole 202 at the first diameter 211. The tool 290 may be rotated about the axis 204, and the first portion 291 of the hybrid tool 290 may be advanced into the hole 202. Accordingly, the thread cutting device 234 of the first portion 291 may remove material to form cut threads 280 (FIG. 5). Chips may be received within the openings 256 for removal from the workpiece 200. These threads 280 may be cut at a minor diameter 294 and at a major diameter 295. The major diameter 295 may, at most, be equal to the second diameter 212 of the hole 202.

Next, the tool 290 may continue to rotate and may be further advanced along the axis 204 such that the second portion 292 is provided in the hole 202 (FIG. 6). If the second portion 292 is configured as a burnishing tap, then the second portion 292 may polish and smooth the threads 280, resulting in converted threads 282 (polished threads). If the second portion 292 is configured as a rolling tap, then the second portion 292 may further plastically deform the threads 280, resulting in converted threads 282 (rolled threads). These threads 282 may be provided at a minor diameter 296 and at a major diameter 297. The major diameter 297 may define the third diameter 213 of the hole 202. The second portion 292 may, consequently, densify the zone 214 about the threads 282. Accordingly, porosity within the remaining material left between the second diameter 212 and the third diameter 213 may be reduced by the plastic deformation from the burnishing or rolling action. Also, residual stress may be increased in this zone 214 to improve thread characteristics.

In some embodiments, the hybrid tool 290 may be configured with the cutting tap 250 and embodiments in which the second portion 292 is configured as a rolling tap. The thread dimensions of the cut threads 280 may be chosen according to the thread dimensions of the rolled threads 282. For example, the cut thread major diameter 295 may be, at most, ninety-five percent (95%) of the rolled thread major diameter 297. Furthermore, in some embodiments, the cut thread major diameter 295 may be between approximately eighty percent (80%) and ninety-five percent (95%) of the rolled thread major diameter 297, and in some embodiments between approximately ninety percent (90%) and ninety-five percent (95%) of the rolled thread major diameter 297. This hybridized threading method may provide a number of benefits, such as reductions in tooling costs, increases in manufacturing efficiency, etc.

Once threaded, the holes 102, 202 described herein may be used for threadably attaching to a bolt. In some embodiments, the holes 102 may ultimately be used as a main bearing bolt hole for an engine block.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of manufacturing an engine block with a threaded hole from a workpiece comprising:
   providing the workpiece having a region with a hole, the region having a cross sectional thickness proximate the hole, the cross sectional thickness measured along a length of the hole;
   inserting and advancing a tapered end of a rod into the hole to expand the hole and densifying a region proximate the hole to reduce a material porosity in the region and to create a densified region proximate the hole without significantly changing the cross sectional thickness; and
   cutting a threading for the hole into the densified region.

2. The method of claim 1, wherein densifying the region includes radially expanding the hole before cutting the threading for the hole.

3. The method of claim 2, wherein cutting the threading includes providing a plurality of cut threads at a minor diameter;
   wherein radially expanding the hole includes expanding the hole from a first hole diameter to a second hole diameter; and
   wherein the second diameter dimension is approximately equal to the minor diameter.

4. The method of claim 2, wherein cutting the threading includes providing a plurality of cut threads at a minor diameter;
   wherein radially expanding the hole includes expanding the hole from a first hole diameter to a second hole diameter; and
   further comprising selecting the second diameter according to the minor diameter.

5. The method of claim 2, wherein the cutting the threading includes providing a plurality of cut threads at a major diameter; and
   wherein radially expanding the hole includes densifying the region within a zone radiating outward from the hole to an outer radial dimension that is, at least, equal to the major diameter.

6. The method of claim 2, wherein radially expanding the hole includes radially expanding the hole via cold working.

7. A method of manufacturing a threaded hole in a main bearing bolt hole of an engine block comprising:
   providing the engine block having a region with a hole, the hole having a smooth inner diameter surface, the region having a cross sectional thickness proximate the hole, the cross sectional thickness measured along a length of the hole;
   inserting and advancing a tapered end of a rod into the hole to expand the hole, create a densified region proximate the hole, and to reduce material porosity in the region without significantly changing the cross sectional thickness; and
   after inserting and advancing the tapered end into the hole to expand the hole, cutting a threading for the hole into the densified region.

8. The method of claim 7, further comprising creating the densified region by radially expanding the hole before cutting the threading for the hole.

9. The method of claim 8, wherein cutting the threading includes providing a plurality of cut threads at a minor diameter;
   wherein radially expanding the hole includes expanding the hole from a first hole diameter to a second hole diameter; and
   wherein the second diameter dimension is approximately equal to the minor diameter.

10. The method of claim 8, wherein cutting the threading includes providing a plurality of cut threads at a minor diameter;
    wherein radially expanding the hole includes expanding the hole from a first hole diameter to a second hole diameter; and
    further comprising selecting the second diameter according to the minor diameter.

11. The method of claim 8, wherein the cutting the threading includes providing a plurality of cut threads at a major diameter; and wherein radially expanding the hole includes densifying the region within a zone radiating outward from the hole to an outer radial dimension that is, at least, equal to the major diameter.

12. The method of claim 8, wherein radially expanding the hole includes radially expanding the hole via cold working.

13. A method of manufacturing a threaded hole of an engine block comprising:

providing the engine block having a region with a hole, the hole having a smooth inner diameter surface, the region having a cross sectional thickness proximate the hole that is constant, the cross sectional thickness measured along a length of the hole;

inserting and advancing a tapered end of a rod into the hole to expand the hole, create a densified region proximate the hole, and to reduce material porosity in the region without significantly changing the cross sectional thickness; and after inserting and advancing the tapered end into the hole to expand the hole, cutting a threading for the hole into the densified region.

14. The method of claim 13, further comprising creating the densified region by radially expanding the hole before cutting the threading for the hole.

15. The method of claim 14, wherein cutting the threading includes providing a plurality of cut threads at a minor diameter;

wherein radially expanding the hole includes expanding the hole from a first hole diameter to a second hole diameter; and wherein the second diameter dimension is approximately equal to the minor diameter.

16. The method of claim 14, wherein cutting the threading includes providing a plurality of cut threads at a minor diameter;

wherein radially expanding the hole includes expanding the hole from a first hole diameter to a second hole diameter; and further comprising selecting the second diameter according to the minor diameter.

17. The method of claim 14, wherein the cutting the threading includes providing a plurality of cut threads at a major diameter; and wherein radially expanding the hole includes densifying the region within a zone radiating outward from the hole to an outer radial dimension that is, at least, equal to the major diameter.

18. The method of claim 14, wherein radially expanding the hole includes radially expanding the hole via cold working.

19. The method of claim 14, wherein the rod includes the tapered end and a finishing portion with a constant diameter;

wherein radially expanding the hole includes expanding the hole from a first hole diameter to a second hole diameter; and wherein the constant diameter is approximately equal to the second hole diameter.

20. The method of claim 13, wherein providing the engine block having the region with the hole includes casting the hole into the region.

* * * * *